United States Patent [19]
Hardwig

[11] Patent Number: 5,183,364
[45] Date of Patent: Feb. 2, 1993

[54] DEVICE FOR INSTALLING AN IN-LINE VALVE

[76] Inventor: Ronald B. Hardwig, Rte. 2, Box 109, Makanda, Ill. 62958

[21] Appl. No.: 798,628

[22] Filed: Nov. 26, 1991

[51] Int. Cl.$^5$ .............................................. B23B 41/08
[52] U.S. Cl. ........................................ 408/67; 137/318; 138/94; 408/204
[58] Field of Search ................. 137/318; 138/97, 94; 166/90, 93, 55, 55.1, 298; 169/69; 285/197; 408/67, 68, 204, 207, 83.5, 100, 92, 104

[56] References Cited

U.S. PATENT DOCUMENTS

| | | | |
|---|---|---|---|
| 1,586,956 | 6/1926 | Arbon | 166/69 |
| 1,587,030 | 6/1926 | Palmer | 166/69 |
| 1,648,007 | 11/1927 | Brogdon et al. | 166/55.1 |
| 1,743,338 | 1/1930 | Field | 137/318 |
| 1,851,894 | 3/1932 | Clough | 166/93 |
| 1,879,160 | 9/1932 | Fowzer . | |
| 2,840,166 | 6/1958 | Eckel et al. | 166/55 |
| 2,889,885 | 6/1959 | Hildebrandt | 166/55 |
| 2,919,111 | 12/1959 | Nicolson | 255/1.8 |
| 3,277,964 | 10/1966 | Houpeurt et al. | 166/35 |
| 3,590,920 | 7/1971 | Orund et al. | 166/55 |
| 3,699,996 | 10/1972 | Nichols | 137/318 |
| 3,738,424 | 6/1973 | Osmun et al. | 166/298 |
| 3,804,175 | 4/1974 | Miller | 169/1 A |
| 3,833,020 | 9/1974 | Smith | 138/94 |
| 3,867,964 | 2/1975 | Gardner | 138/94 X |
| 3,993,137 | 11/1976 | Hefetz | 169/69 X |
| 4,163,477 | 8/1979 | Johnson et al. | 166/362 |
| 4,369,845 | 1/1983 | Henson et al. | 166/298 |
| 4,476,935 | 10/1984 | Haynes et al. | 166/373 |
| 4,516,598 | 5/1985 | Stupak | 137/318 |
| 4,552,170 | 11/1985 | Margrave | 138/94 X |
| 4,628,955 | 12/1986 | Smith | 285/197 X |
| 5,076,311 | 12/1991 | Marschke | 137/318 X |

Primary Examiner—Steven C. Bishop
Attorney, Agent, or Firm—Grace J. Fishel

[57] ABSTRACT

A device for installing an in-line valve in a pipe through which fluids under pressure may be flowing. The device has a hollow coring bit and a boring and support housing. The hollow coring bit is housed and guided by the boring and support housing. The hollow coring bit cuts through the sidewalls of the pipe and forms an in-line valve.

10 Claims, 6 Drawing Sheets

DEVICE FOR INSTALLING AN IN-LINE VALVE

The present invention relates to a device for installing an in-line valve in a pipe that can be used to interrupt and then reestablish flow through the pipe.

BACKGROUND OF THE INVENTION

In a producing oil or gas well, a production pipe is surrounded by one or more casings and is in communication with a subterranean hydrocarbon bearing formation where the hydrocarbon gas or liquids are under considerable pressure. This pressure is normally contained by the production pipe. Due to a number of possible causes, including sabotage, an uncontrolled hydrocarbon flow may escape from the well through the production pipe. Such uncontrolled flow is a waste of natural resources and source of pollution with the accompanying hazards of fire and danger to human life and surrounding property.

There are a number of ways to cut off uncontrolled flow in a production pipe, some of which are more applicable to offshore wells and others to land based wells. In general, however, the methods involve pinching the production pipe closed or plugging it with mud or cement. Once the flow has been stopped, it cannot be easily reestablished and the well may be permanently closed.

In view of the above, it would be desirable to provide a device for installing an in-line valve in a pipe that can be used to interrupt and then reestablish flow through the pipe. It is an object of the present invention to provide such a device. Other objects and features of the invention will be in part apparent and in part pointed out hereinafter.

The invention accordingly comprises the constructions hereinafter described, the scope of the invention being indicated by the subjoined claims.

SUMMARY OF THE INVENTION

A main feature of the present invention is to provide a device for installing an in-line valve in a pipe having sidewalls. The device has a hollow coring bit with a cutting end and a driven end and a boring and support housing sealed to the pipe. The boring and support housing has first and second closed chambers communicating with the pipe where the pipe is sealed to the housing. The first chamber has a passage for containing and supporting the hollow coring bit and for directing the cutting end of the bit against and through the sidewalls of the pipe as sections thereof are cut away. The second chamber has a passage in alignment with the passage in the first chamber for receiving the cutting end of the hollow coring bit. There are means for reciprocating the hollow coring bit attached to the boring and support housing. The means for reciprocating the hollow coring bit reciprocates the bit in the passages of the first and second chambers.

BRIEF DESCRIPTION OF THE DRAWINGS

In the accompanying drawings, in which several of various possible embodiments of the invention are illustrated, corresponding reference characters refer to corresponding parts throughout the several views of the drawings and in which.

DETAILED DESCRIPTION OF THE INVENTION

Figure 2:
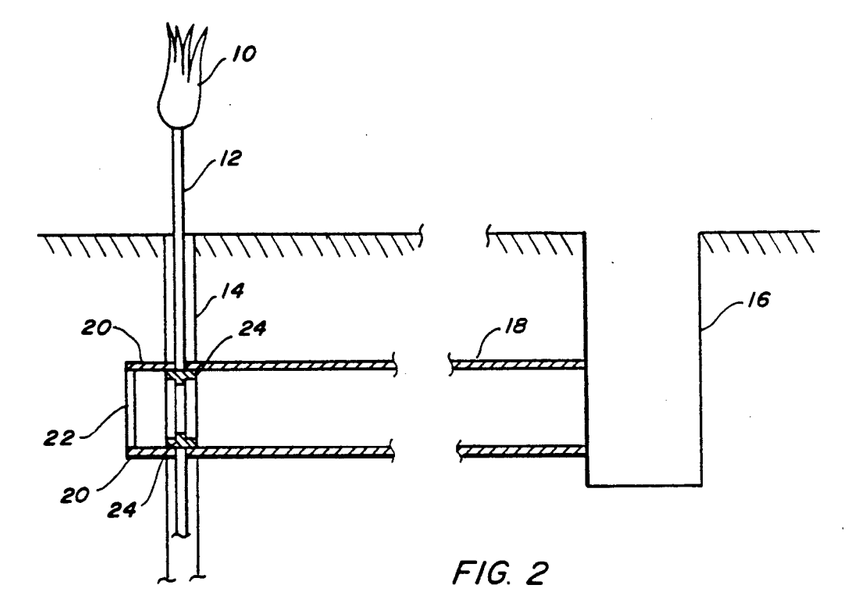
FIG. 2 is an earth section fragmentarily showing a production pipe in relationship to a burning wellhead and the manner in which the production pipe can be accessed from the side.
Figure 3:
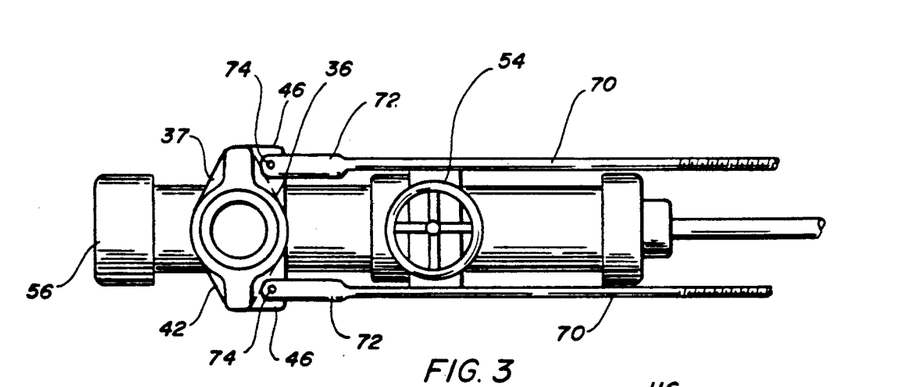
FIG. 3 is a top view of the device shown in FIG. 1 with a boring control plate detached.

Referring to FIG. 2, a land based oil or gas well 10 has a production pipe 12 in communication with a subterranean hydrocarbon bearing formation. Production pipe 12 is surrounded by a well casing 14 (or casings).

Assuming that well 10 is ablaze, an excavation 16 is made a safe distance from the well. Excavation 16 is of such depth to allow a shaft casing 18 to be installed tunneling in the direction of well casing 14 and big enough to allow a man to walk upright. Suitable equipment to make excavation 16 and install shaft casing 18 is available and is outside the scope of the present invention.

Once shaft casing 18 reaches well casing 14, the casing of the shaft is slotted to pass around the well casing. Cover plates 20 are then welded over the slots and shaft casing 18 welded to well casing 14. A shoring 22 is installed at the end of shaft casing 18. The well casing 14 is then cut away to expose production pipe 12 and sealing shields 24 are added for support and to stop any flow in the space between well casing 14 and production pipe 12 (or between the nested well casings).

After production pipe 12 has been exposed as shown in FIG. 2, a device 26 for installing an in-line valve in accordance with the present invention is attached. Referring now to FIGS. 1 and 3-6, device 26 includes a hollow coring bit 28 and a boring and support housing 30. Hollow coring bit 28 has a cutting end 32 and a driven end 34 and is more particularly described below.

Figure 5:
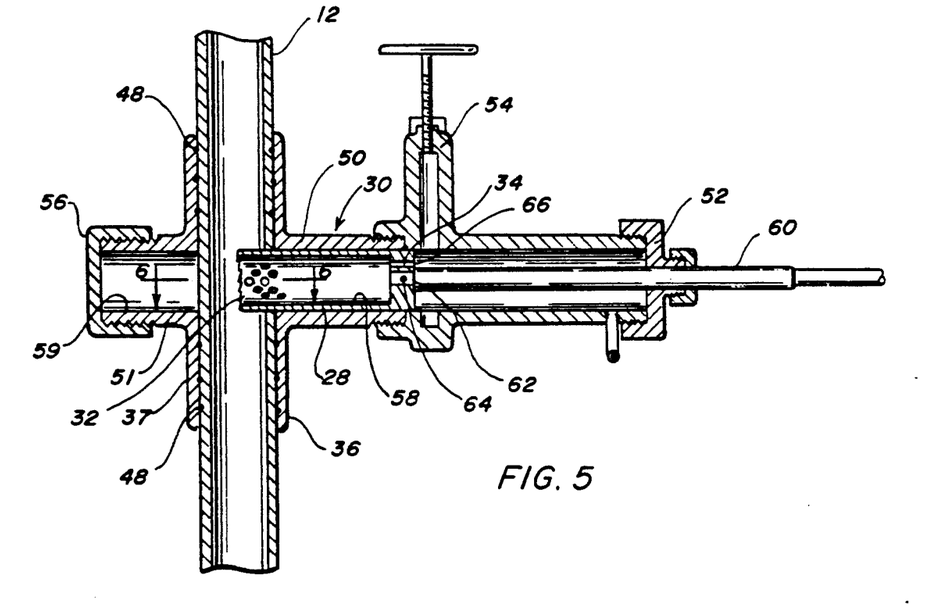
FIG. 5 is a section taken on center line of the device as viewed in FIG. 3.

Boring and support housing 30 is sealed to production pipe 12. In the form illustrated, boring and support housing 30 has two circumferentially separable housing sections 36, 37. Housing sections 36, 37 have flanges 38 with alignment bushings 40 and stiffeners 42 and are fastened together by means of bolts 44 inserted in flanges 38. The endmost stiffeners 42 on housing section 36 are enlarged to form attachment ears 46 for use as described hereinafter. Boring and support housing 30 is dimensioned for friction fit on production pipe 12 and, as shown in FIG. 5, may be grooved for receipt of a plurality of friction rings 48. Corresponding grooves for friction rings 48 may be provided in production pipe 12.

Boring and support housing 30 has first and second closed chambers 50, 51 communicating with the pipe where it is sealed to the housing. Chambers 50, 51 may be integrally formed as part of housing sections 36, 37 (as shown) or formed separately and housing sections 36, 37 bored and tapped for threaded receipt of chambers 50, 51. As shown, first chamber 50 is closed with a boring access cap 52 and includes a valve 54, shown as gate valve, through which hollow coring bit 28 passes. Second chamber 51 is closed with an access cap 56.

Chambers 50, 51 are positioned on opposite sides of production pipe 12 and have aligned passages 58, 59, respectively. Passage 58 in first chamber 50 contains and supports hollow coring bit 28 and directs cutting end 32 of hollow coring bit 28 against and through the sidewalls of production pipe 12. Passage 59 in second chamber 51 receives cutting end 32.

As shown in FIG. 5, hollow coring bit 28 fits snugly in aligned passages 58, 59. Hollow coring bit 28 is firmly attached to a boring shaft 60 (such as with a key 62 and a roll pin 64) to prevent accidental separation. Boring shaft 60 is journaled for rotation in boring access cap 52 and a pressure relief hole 66 is provided in the base of hollow coring bit 28 so that the pressure in the well exerts minimal reverse force on the bit when the bit penetrates the production pipe.

Figure 1:
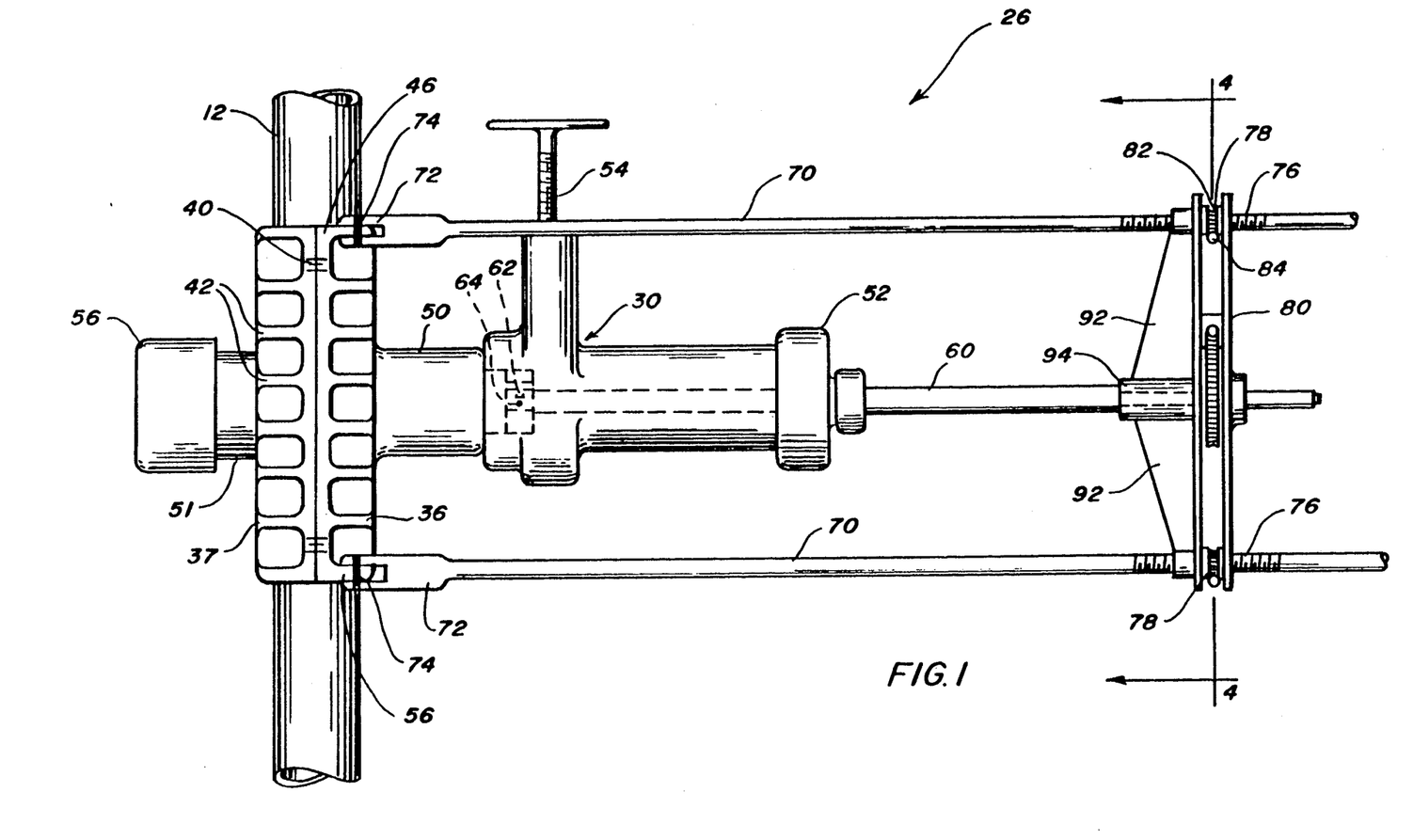
FIG. 1 is a side elevation of a device for installing an in-line valve in a pipe in accordance with the present invention.
Figure 4:
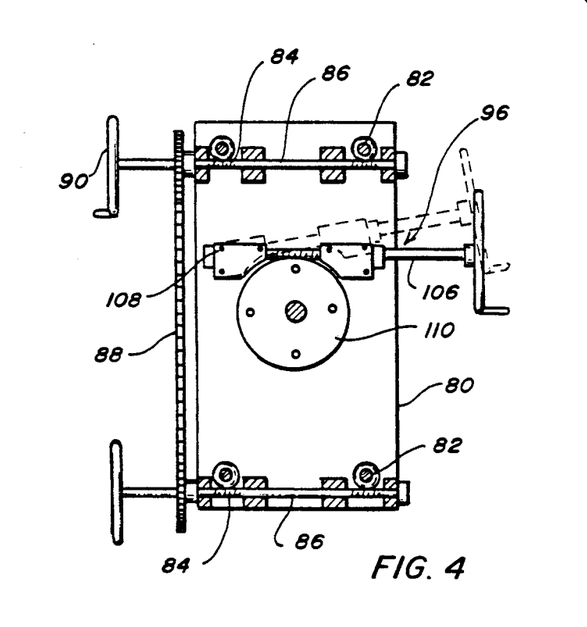
FIG. 4 is an end view taken in the direction of line 4—4 in FIG. 1.

With reference to FIGS. 1 and 4, means for reciprocating the hollow coring bit 68 in passages 58, 59 take the form of four reciprocating takeup rods 70, each of which terminate at one end with a clevis 72. Each clevis is attached with a pin 74 to one of ears 46. The opposite ends 76 of reciprocating takeup rods 70 are threaded and are received in thrust bearings 78 provided in the four corners of a boring control plate 80. Each of thrust bearings 78 has a race 82 which is meshed on the inside to ride on reciprocating takeup rods 70 and on the outside to mesh with a worm gear 84. As shown, two worm gears are mounted on each of two axles 86. The axles are attached to boring control plate 80 and are interconnected with a chain drive 88. When one of the axles is turned with a crank 90, chain drive 88 causes the other axle to move in concert causing boring control plate 80 to move towards or away from production pipe 12, depending on the direction in which the crank is turned. On the opposite side of boring control plate 80, four triangular shaped web stiffeners 92 radiate from thrust bearings 78. Web stiffeners 92 are attached to a shaft thrust 0 bearing 94 provided in the center of boring control plate 80 and into which boring shaft 60 is journaled. Means for indexing the bit 96 are shown in FIG. 4 and are discussed below.

Figure 6:
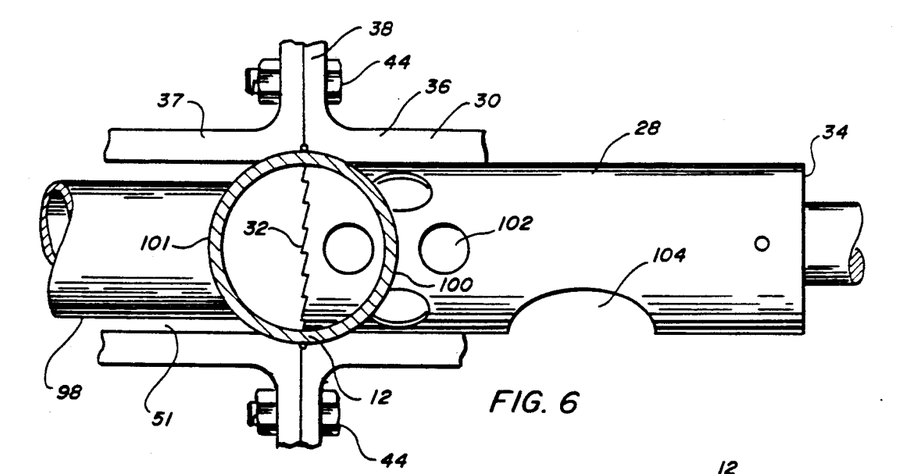
FIG. 6 is an enlarged section taken along line 6—6 in FIG. 5.

Hollow coring bit 28 forms means for plugging flow in production pipe 12 when cutting end 32 is in second chamber 51. As illustrated in FIG. 6, hollow coring bit 28 has a slightly larger outside diameter (e.g., about 0.1 inch) than the inside diameter of production pipe 12 so that when it cuts across the production pipe it forms a complete plug. A backup plug 98 is provided in second chamber 51. The outside diameter of backup plug 98 is slightly less than the inside diameter of the hollow coring bit and its forward end is conformed with the exterior surface of the production pipe 12. As backup plug 98 slides within the hollow coring bit 28, it pushes front and rear sections 100, 101 of the production pipe into the bit so that they are removed when the bit is withdrawn. A plurality of holes 102 may be provided in the tip of hollow coring bit 28 for relief of pressure as the bit begins to cut across production pipe 12. Spaced a distance from holes 102, a larger hole 104 may also be provided to direct flow through second chamber 51.

When larger hole 104 is present, means for indexing the bit 96 can take the form of a worm gear drive 106 attached on a pivot 108 to boring control plate 80. As shown in FIG. 4, an externally toothed disk 110 with markings indexed to the orientation of larger hole 104 is attached to boring shaft 60. Worm gear drive 106 on pivot 108 is then brought in and out of mesh with toothed disk 110 for indexing the hollow coring bit or for freeing a stuck bit.

In use, housing sections 36, 37 are bolted onto exposed production pipe 12. Hollow coring bit 28 is firmly attached to boring shaft 60 and inserted into passage 58 of first chamber 50 with the end of boring shaft 60 passing through boring access cap 52. Means for reciprocating the hollow coring bit 68 in passages 58, 59 are connected and used to bring cutting end 32 of hollow coring bit 28 into contact with the sidewall of production pipe 12. Continued movement of means for reciprocating the hollow coring bit 68 in the direction of production pipe 12, causes cutting end 32 to remove front and rear sections 100, 101 of the production pipe. As backup plug 98 slides into hollow coring bit 28, front and rear sections 100, 101 are pushed into hollow core bit 28. When cutting end 32 of hollow coring bit 28 has reached passage 59 in second chamber 51, it forms an in-line valve closing off flow through production pipe 12.

With hollow coring bit 28 acting as an in-line valve, the wellhead can be repaired and flow through production pipe 12 reestablished by removing hollow coring bit 28. This reverse operation is accomplished by reversing the motion of means for reciprocating the hollow coring bit 68. When hollow coring bit 28 has been withdrawn beyond valve 54 in passage 58, valve 54 can then be closed and hollow coring bit 28 removed entirely through boring access cap 52. Device 26 minus hollow coring bit 2 is left in place for use another time, if ever needed. If the wellhead cannot be repaired, flow from the well can be established through first or second chambers 50, 51 by removing access cap 56 or boring access cap 52 and attaching appropriate connections.

When hollow coring bit 28 has larger hole 104, hollow coring bit 28 is indexed such that larger hole 104 is turned away from the inlet of the pipe as front and rear sections 100, 101 are cut away. Access cap 56 is removed and appropriate connections attached to second chamber 51. Means for indexing the hollow coring bit 96 are then used to rotate larger hole 104 towards the inlet establishing flow through second chamber 51. In this instance, device 26 with hollow coring bit 28 is left in place for use as a shutoff valve.

Figure 7:
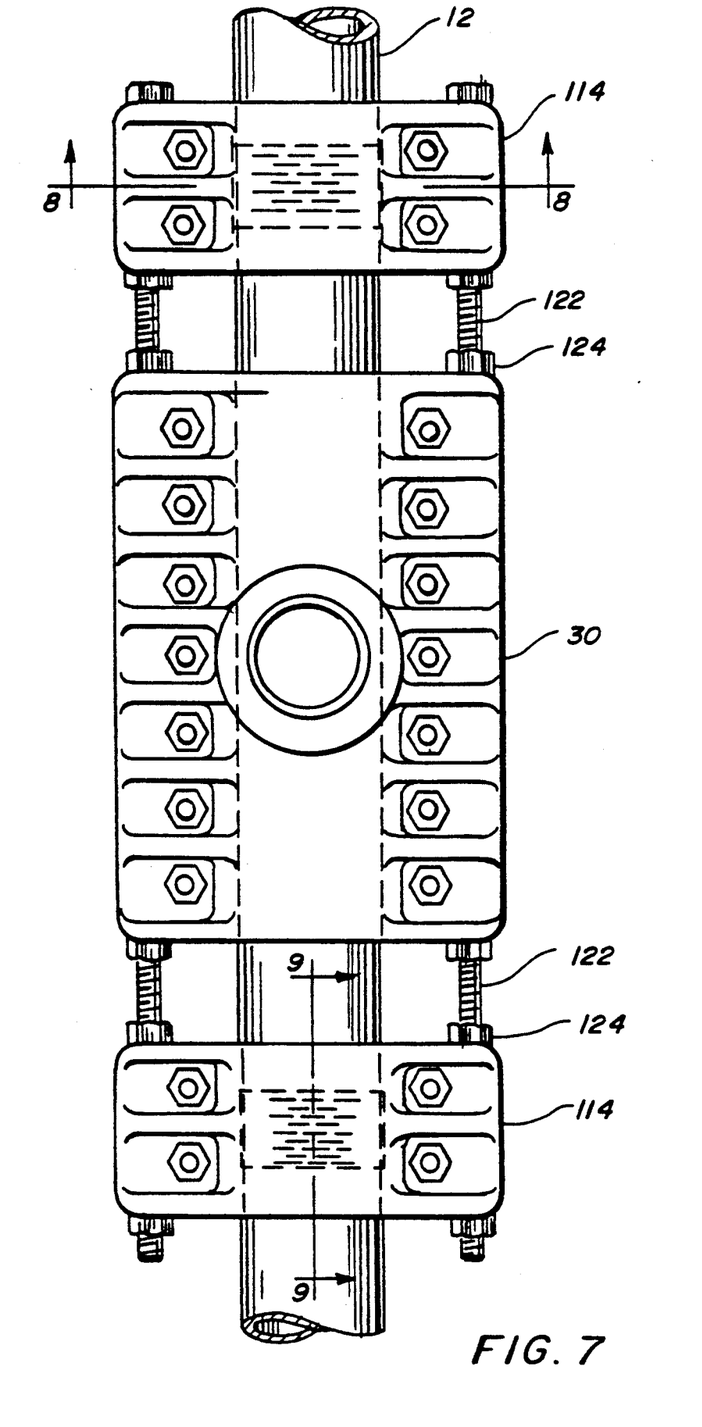
FIG. 7 is a second embodiment of the invention showing auxiliary means for securing a boring and support housing to the production pipe.
Figure 8:
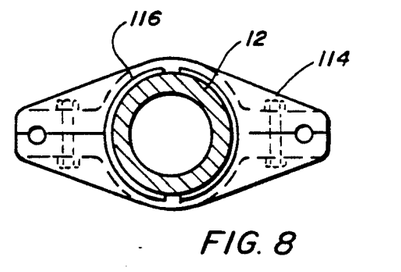
FIG. 8 is a section taken along line 8—8 in FIG. 7.
Figure 9:
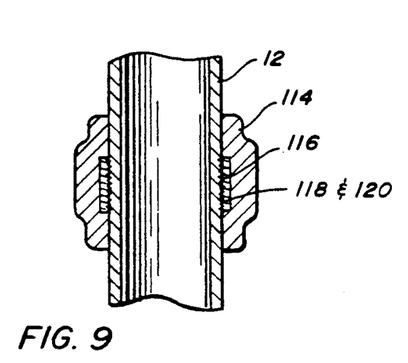
FIG. 9 is a section taken along line 9—9 in FIG. 7.

Other embodiments of the invention are illustrated in FIGS. 7-12. With reference to FIGS. 7-9, one of a number of possible takeup means for securing boring and support housing 30 to production pipe 12 is shown. In this instance, a clamp 114 is mounted above and below boring and support housing 30. Clamp 114 has two circumferentially separable sections lined with a split compression ring 116. Clamp 114 is slightly undersized for positive tightening of compression ring 116 and compression ring 116 has a series of first lands and grooves 118 which fit into corresponding second lands and grooves 120 cut into production pipe 12 for that purpose. As will be understood by those skilled in the art, it is difficult to cut two sets of accurately spaced apart corresponding second lands and grooves 120 in production pipe 12. This difficulty is solved with spacing takeup rods 122 with adjusting nuts 124 for connecting clamps 114 to boring and support housing 30.

In use, boring and support housing 30 is attached to production pipe 12 and two sets of corresponding second lands and grooves 120 are cut in production pipe 12 above and below the housing. Adjusting nuts 124 are loosened and clamps 114 accurately positioned such that first lands and grooves 118 in compression ring 116 engage corresponding second lands and grooves 120 in production pipe. Clamps 114 are then tightened and secured to boring and support housing 30 by adjusting nuts 124 on spacing takeup rods 122. This arrangement for more positively gripping production pipe 12 is particularly advantageous when the hollow coring bit 28 is large enough to weaken or sever production pipe 12 so that it tends to fly apart.

In some instances it is preferred that the outside diameter of hollow coring bit 28 be less than the inside diameter of production pipe 12. When this occurs, some provision must be made for expanding the diameter of the bit after cutting end 32 has reached second chamber 1. One suitable means for this purpose is shown in FIGS. 10-12.

Figure 10:
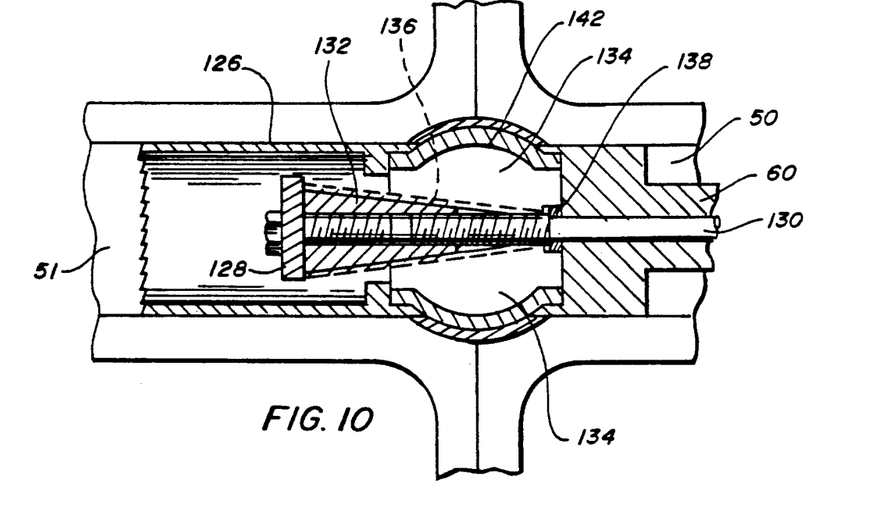
FIG. 10 is a section similar to FIG. 6 but showing a third embodiment of the invention.
Figure 11:
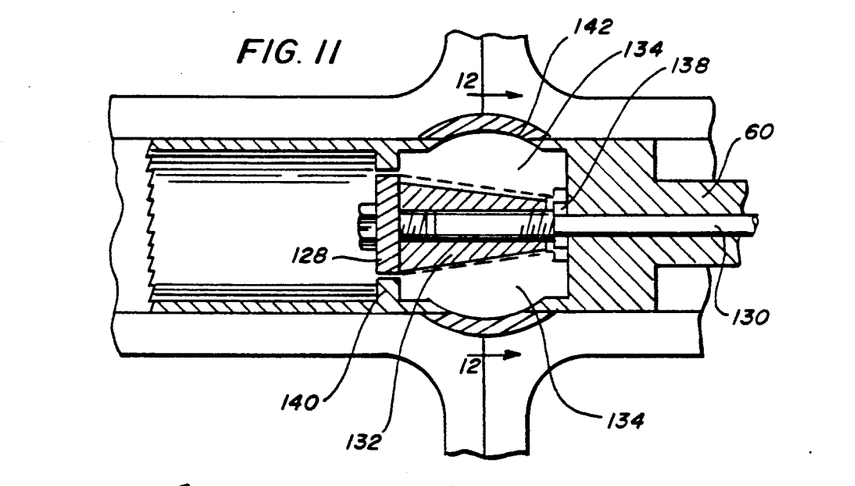
FIG. 11 is similar to FIG. 10 but showing the embodiment moved into pipe obstructing position.
Figure 12:
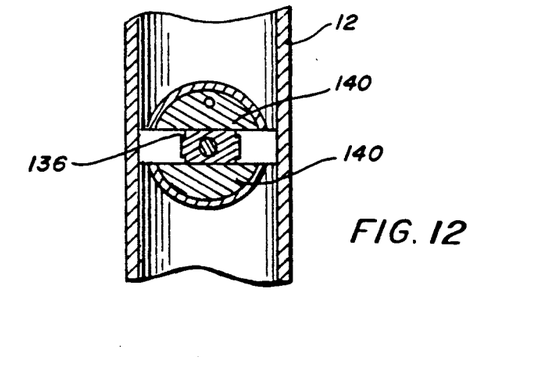
FIG. 12 is a section taken along line 12—12 in FIG. 11.

With continuing reference to FIGS. 10-12, a hollow coring bit with vanes 126 includes a movable centering plug 128 mounted inside the base of the bit. Movable centering plug 128 is attached to a vane takeup rod 130 centered in boring shaft 60. A vane wedge 132 is attached to movable centering plug 128 and a pair of vanes 134 are attached to vane wedge 132 with dovetail joints 136 for positive expansion and retraction of the vanes. Vanes 134 are confined in a compartment at the base of the bit defined by a thrust bushing 138 attached to boring shaft 60 and a pair of support blocks 140. An outer surface 142 of vanes 134 is sized and curved to conform to and fill the inside of production pipe 12.

In use after cutting end 32 of hollow coring bit with vanes 126 reaches second chamber 51, means for indexing the bit 96 are used to orient the bit so that when it expands it will fill production pipe 12. When the bit is in proper orientation, vane takeup rod 130 is tightened pulling movable centering plug 128 towards the base of the bit and with it vane wedge 132. As vane wedge 132 moves relative to vanes 134, vanes 134 slide along dovetail joints 136 and outer surface 142 is brought into contact with the inner walls of production pipe 12 forming an in-line valve. When the in-line valve is no longer needed, vanes 134 can be retracted by loosening van takeup rod 130 carrying with it movable centering plug 128 and vane wedge 132. Hollow coring bit with vanes 126 can then be removed from first chamber 50 in the same manner as hollow coring bit 28 discussed above.

Figure 13:
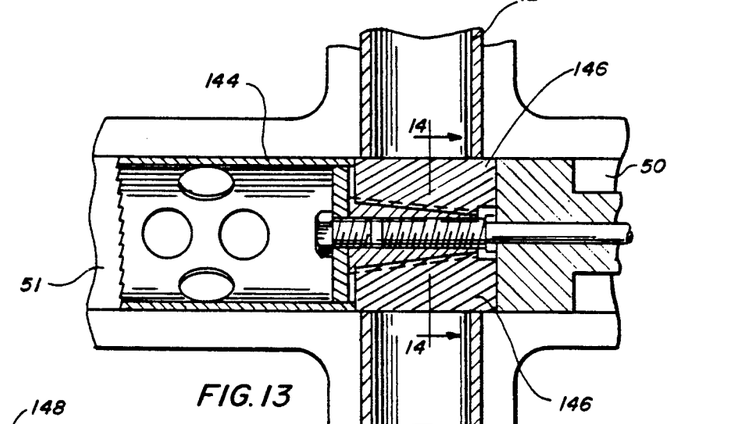
FIG. 13 is a section similar to FIG. 10 but at a right angle thereto and of a fourth embodiment of the invention; and, FIG. 14 is a section taken along line 14—14 in FIG. 13.
Figure 14:
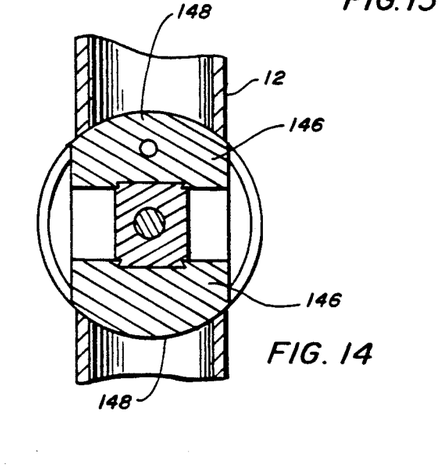

In other instances as shown in FIGS. 13-14 it is preferred that the outside diameter of hollow coring bit 28 be greater than the outside diameter of production pipe 12. When this occurs, the bit will block the pipe as the cut is made. It may be advantageous, however, to provide means for expanding the diameter of the hollow coring bit for supplemental sealing. Hollow coring bit with pads 144 can be used for this purpose. With continuing reference to FIGS. 13-14, pads 146 are mounted in recesses provided in hollow coring bit with pads 144. When hollow coring bit with pads 144 (now provided in oversized form) reaches second chamber 51, means for indexing the bit 96 are used to orient the bit so that means for expanding the diameter of the bit urges pads 146 towards the severed ends of production pipe 12 (as opposed to expanding them laterally as in the case of vanes 134 in FIGS. 10-12). Outer surface 142 of vanes 134 and outer surface 148 of pads 146 may be rubberized for improved seal.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense. In this connection, it will be understood that device 26 can be used to install an in-line valve in any pipe where one is required and the utility of the invention is therefore not limited to the control of oil and gas wells which have gone wild.

What is claimed is;

1. A device for installing an in-line valve in a pipe having sidewalls, said device comprising a hollow coring bit with a cutting end and a driven end and a boring and support housing sealed to the pipe, said housing having first and second closed chambers communicating with the pipe where it is sealed to the housing, said first chamber having a passage for containing and supporting the hollow coring bit and directing the cutting end of the hollow coring bit against and through the sidewalls of the pipe cutting away sections thereof, said second chamber having a passage in alignment with the passage in the first chamber for receiving the cutting end of the hollow coring bit, said housing having means for reciprocating the hollow coring bit in the passages of the first and second chambers, said hollow coring bit having a pressure relief hole in the driven end, said pressure relief hole connecting the interior of the hollow coring bit with the interior of the first chamber to substantially equalize axial pressure on the driven end, said hollow coring bit forming means for plugging flow in the pipe when the cutting end of the hollow coring bit is in the second chamber whereby said hollow coring bit forms an in-line valve when the hollow coring bit is axially reciprocated between an open and a closed position.

2. The device of claim 1 where said second chamber has means for pushing the cutaway sections of sidewall into the hollow coring bit for removal.

3. The device of claim 1 wherein the cutting end of the hollow coring bit has a plurality of holes for relief of pressure as the hollow coring bit beings to cut across the pipe.

4. The device of claim 1 wherein a valve transversely divides the first chamber into two sections and through which the hollow coring bit can be inserted and removed.

5. The device of claim 1 wherein the means for reciprocating the hollow coring bit comprises a thrust bearing attached to a boring control plate, said boring control plate supported by a plurality of takeup rods attached at one end to the housing and threaded at the opposite end for engagement with a worm gear mechanism operated by a crank for moving the hollow coring bit towards and away from the pipe depending on the direction in which the crank is turned.

6. A device for installing an in-line valve in a pipe having sidewalls, said device comprising a hollow coring bit with a cutting end and a driven end adapted for attachment to a boring shaft and a boring and support housing sealed to the pipe, said housing having first and second closed chambers communicating with the pipe where it is sealed to the housing, said first chamber having a passage for containing and supporting the hollow coring bit and directing the cutting end of the hollow coring bit against and through the sidewalls of the pipe cutting away sections thereof, said first chamber having a valve transversely dividing the first chamber into two sections and through which the hollow coring bit can be inserted and removed, said second chamber having a passage in alignment with the passage in the first chamber for receiving the cutting end of the hollow coring bit, said housing having means for reciprocating the hollow coring bit through the passages within the first and second chambers, said hollow coring bit having a pressure relief hole in the driven end, said pressure relief hole connecting the interior of the hollow coring bit with the interior of the first chamber to substantially equalize axial pressure on the driven end, said hollow coring bit forming means for plugging flow in the pipe when the cutting end of the hollow coring bit is in the second chamber whereby said hollow coring bit forms an in-line valve when the hollow coring bit is axially reciprocated between an open and a closed position.

7. The device of claim 6 wherein means are provided outside the first chamber for indexing the hollow coring bit to the boring shaft whereby the orientation of the hollow coring bit can be determined by noting the orientation of the boring shaft.

8. The device of claim 6 wherein said second chamber has means for pushing the cutaway sections of sidewall into the hollow coring bit for removal.

9. The device of claim 6 wherein the hollow coring bit has means for expanding the diameter of the hollow coring bit after the cutting end has reached the second chamber whereby the seal between the hollow coring bit and the cut sidewalls of the production pipe is improved.

10. The device of claim 6 wherein a set of lands and grooves are formed in the production pipe above and below the boring and support housing and wherein a pair of auxiliary clamps with mating lands and grooves are clamped to the production pipe over the lands and groves formed in the production pipe, said clamps attached to the boring and support housing by a plurality of adjustable takeup rods.

* * * * *